J. W. LIVERMORE.
FRICTION CLUTCH.
APPLICATION FILED NOV. 17, 1919.

1,411,110.

Patented Mar. 28, 1922.

INVENTOR.
John W. Livermore
BY
ATTORNEY

UNITED STATES PATENT OFFICE.

JOHN W. LIVERMORE, OF FRESNO, CALIFORNIA, ASSIGNOR OF ONE-HALF TO LISENBY MANUFACTURING COMPANY, OF FRESNO, CALIFORNIA.

FRICTION CLUTCH.

1,411,110.  Specification of Letters Patent.  Patented Mar. 28, 1922.

Application filed November 17, 1919. Serial No. 338,504.

*To all whom it may concern:*

Be it known that I, JOHN W. LIVERMORE, a citizen of the United States, residing at Fresno, county of Fresno, State of California, have invented certain new and useful Improvements in Friction Clutches; and I do declare the following to be a full, clear, and exact description of the same, reference being had to the accompanying drawings, and to the characters of reference marked thereon, which form a part of this application.

This invention relates to improvements in clutches such as are employed to transmit power from one shaft or member to another, and to take hold with an easy and gradual grip.

The principal object of the invention is to provide a dry friction clutch which will be substantial and of simple construction, and which will have two pairs of faces adapted to frictionally contact with each other, so that a large load may be transmitted by a relatively small clutch.

Another object of the invention is to so construct the clutch that the friction wearing surfaces may be quickly and easily replaced without the need of employing an expert mechanic; and whose parts may be so adjusted relative to each other that the replaceable wearing members need not be of the same thickness as the original ones.

These two latter features render this clutch particularly adaptable for use on farm tractors and the like, since these machines are apt to be handled by men having only an elementary mechanical knowledge.

It is in fact this form of clutch that I have preferably embodied in the tractor shown in my copending application for Patent Serial No. 337,315, filed November 11th, 1919.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
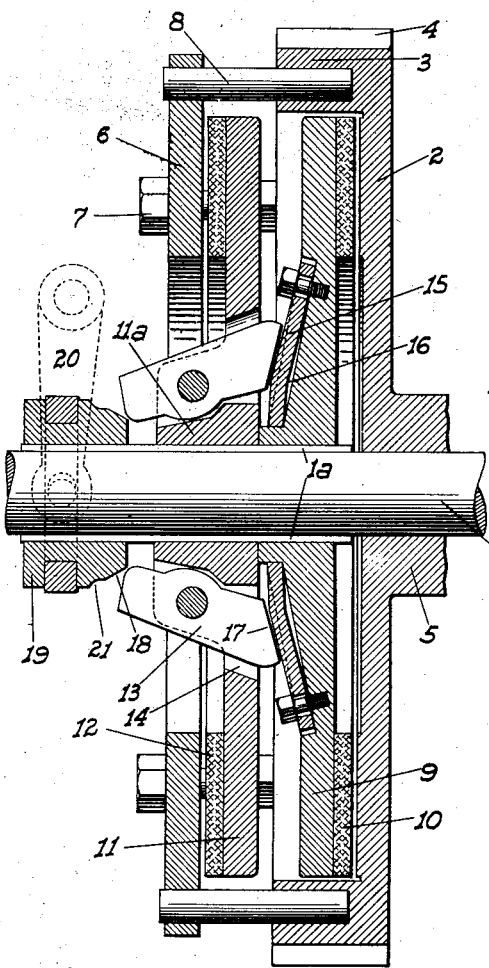
Fig. 1 is a sectional elevation of my improved clutch, showing the parts disengaged.
Figure 2:
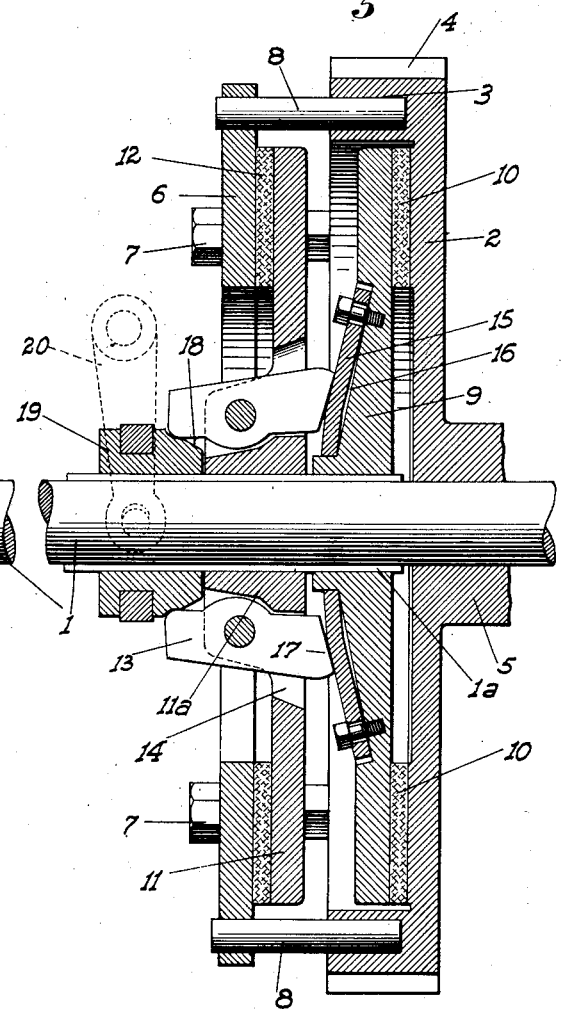
Fig. 2 is a similar view, showing the clutch dogs thrown in and the parts locked together to turn as a unit.
Figure 3:
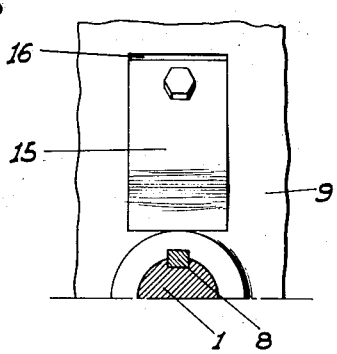
Fig. 3 is a fragmentary side elevation of one of the clutch discs, showing a spring plate therein.
Figure 4:
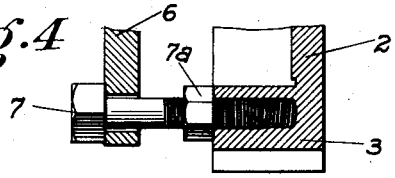
Fig. 4 is a fragmentary view showing one of the adjustment bolts of the clutch discs.

Referring now more particularly to the characters of reference on the drawings, the numeral 1 denotes the driving shaft on which is turnably mounted a disc 2. This disc has an outer rim 3 which may have peripheral teeth 4 cut therein to transmit power, or the power may be taken to a pinion, etc., on the end of the hub 5 of the disc, depending on conditions.

Spaced somewhat from the disc 2 is a ring 6, which is adjustably secured to the disc by a plurality of bolts 7, having lock nuts 7$^a$. These two members form the portion of the clutch relatively stationary to the shaft, being fixed to prevent longitudinal movement thereof on the shaft. Hardened pins 8 are secured to the disc 2 and project through close fitting holes in the ring 6, in peripheral alinement with the bolts 7.

Slidably mounted on the shaft 1 on feathers 1$^a$ therein is a disc 9 adjacent the disc 2 between the same and the ring 6 and adapted to fit inside the rim 3 thereof. This disc is provided with a ring 10 of friction material of any suitable quality, such as may be obtained on the market for the purpose, which is adapted to bear against the face of the disc 2 when the clutch is thrown in, but otherwise spaced somewhat therefrom.

Similarly positioned relative to the ring 6 between the same and the disc 2 and slidable on the feathers 1$^a$ is a disc 11, fitting inside the line of the bolts 7 and having a ring 12 of friction material also adapted to bear against the face of the ring when the clutch is thrown in, but otherwise spaced therefrom.

Dogs 13 are pivoted in the hub 11$^a$ of the disc 11, and project through slots 14 in the said disc, terminating adjacent substantially flat and stiff springs 15 mounted in pockets 16 in the disc 9.

When the clutch is disconnected these dogs slant from their ends adjacent the springs toward the shaft 1 at an acute angle thereto and away from the disc, while such ends are also angled relative to the shaft but at a greater angle, though less than 90 degrees, as shown at 17.

The outer ends of the dogs are adapted to contact with the beveled end 18 of a sleeve 19 slidable on the feathers 1ᵃ, the movement of this sleeve being controlled by means of a throw mechanism such as indicated by 20, this feature being common construction.

The sleeve 19 at the inner end of the beveled portion is grooved as at 21, in order to seat therein the ends of the dogs when the latter have been spread in the throwing-in of the clutch, thus ensuring that the clutch will remain locked without it being necessary to retain pressure on the sleeve-moving lever mechanism.

In the operation of the clutch, the members 9 and 11, and the parts connected thereto, which form the driving unit of the clutch, turn continuously with the rotation of the shaft 1.

As soon as the sleeve 19 is moved along the shaft toward the disc 11, the dogs 13 are forced to mount the beveled face of the sleeve, which causes the sloping ends of the dogs adjacent the springs to bear thereagainst and force the friction ring 10 on the disc 9 against the face of the stationary disc 2. The distance moved over by the disc 9 before contacting with the disc 2 is only about half that of the total travel possible with the full springing of the dogs on the sleeve.

Since the disc 2 is immovable in a vertical plane or lengthwise of the shaft, any further movement of the disc 9 is impossible. Hence the disc 11 then moves away from the disc 9 during the remainder of the springing of the dogs, which causes the friction ring on the disc 11 to bear against the ring 6 which is secured to, and is practically a unit with, the disc 2.

Thus not only are two pairs of surfaces frictionally contacted with equal pressure, but the opposed positioning thereof eliminates end thrust, and the entire clutch turns freely as a unit without any frictional binding on its bearings.

The spring plates 15 against which the dogs bear allow a certain amount of resiliency after the friction faces are firmly contacted so that the dogs may be sprung into the sleeve-groove 21 by the flattening of the springs.

The holes for the bolts 7 in the ring 6 are larger than the bolts, so that the latter are only under tensional strain, and never under a bending strain. The actual strain when under load, is taken by the hardened pins 8.

To alter the spacing between the discs 2 and 6, it is only necessary to loosen the locknuts 7ᵃ, and adjust the bolts 7 to suit conditions. By removing the bolts 7 entirely, all the discs may be readily separated, and by raising the shaft and sliding the discs off the same, new friction rings 12 may be attached.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A friction clutch comprising a driving shaft, a pair of connected and spaced driven discs fixed lengthwise of the shaft, but turnable thereon, a pair of driving discs separately and slidably splined on the shaft and adapted to contact with the respective adjacent faces of the driven discs, a bevel-edge sleeve slidable on the shaft beyond the discs and adapted for movement theretoward, and dogs pivoted in one of the driving discs and adapted to contact with the other one of the driving discs and with the beveled edge of the sleeve, the adjacent one of the driven discs being provided with an enlarged central orifice for the projection of the dogs therethrough, the dogs sloping inwardly toward the sleeve, and the ends of the same adjacent the driving disc with which they contact sloping away therefrom toward the center, whereby when the dogs are sprung apart with the movement of the sleeve, the horizontal distance from the pivotal point of the dogs to the inner ends thereof will be increased.

2. A friction clutch comprising a driving shaft, a pair of connected and spaced driven discs fixed lengthwise of the shaft but turnable thereon, independent driving discs slidably splined on the shaft and adapted to contact with the respective adjacent faces of the driven discs, expanding dogs pivoted to one of the driving discs and bearing against the other, a sleeve slidable on the shaft and adapted to expand the dogs, and means whereby after the discs are forced into frictional contact with each other by the movement of the dogs and the sleeve, the latter may be moved still further and the dogs caused to lock thereon against undesired retractive movement.

3. A friction clutch comprising a driving shaft, a pair of connected and spaced driven discs fixed lengthwise of the shaft but turnable thereon, independent driving discs slidably splined on the shaft and adapted to contact with the respective adjacent faces of the driven discs, expanding dogs pivoted to one of the driving discs and bearing against the other, a sleeve slidable on the shaft and adapted to expand the dogs, a peripheral groove on the sleeve adapted to engage the ends of the dogs after the latter have been moved to force the discs into frictional engagement, and springs on the last named driving disc and against which the dogs bear, said springs being compressed only after the discs are in contact and the sleeve is moved further to engage the ends of the dogs with the groove.

In testimony whereof I affix my signature in presence of two witnesses.

JOHN W. LIVERMORE.

Witnesses:
M. E. HURDLE,
GUSTAVE E. LUNDIN.